United States Patent
Zhuang (10) Patent No.: US 10,887,629 B1
(45) Date of Patent: Jan. 5, 2021

(54) BASKETBALL VIDEO INTERACTION METHOD AND DEVICE, INTELLIGENT BASKETBALL STAND AND STORAGE MEDIUM

(71) Applicant: Richard Zhuang, Temple City, CA (US)

(72) Inventor: Richard Zhuang, Temple City, CA (US)

( * ) Notice: Subject to any disclaimer, the term of this patent is extended or adjusted under 35 U.S.C. 154(b) by 0 days.

(21) Appl. No.: 16/735,717

(22) Filed: Jan. 7, 2020

(30) Foreign Application Priority Data

Dec. 2, 2019 (CN) .......................... 2019 1 1215227

(51) Int. Cl.
  *H04N 21/2187* (2011.01)
  *H04N 21/81* (2011.01)
  *H04N 21/234* (2011.01)

(52) U.S. Cl.
  CPC ... *H04N 21/2187* (2013.01); *H04N 21/23418* (2013.01); *H04N 21/8133* (2013.01)

(58) Field of Classification Search
  CPC ... H04L 65/604; H04L 65/4092; H04L 65/10; H04N 21/2187; H04N 21/23418; H04N 21/8133
  See application file for complete search history.

(56) References Cited

U.S. PATENT DOCUMENTS

| | | | |
|---|---|---|---|
| 6,536,770 B1* | 3/2003 | Yang | A63B 63/06 273/317.3 |
| 2005/0143154 A1* | 6/2005 | Bush | A63F 13/812 463/4 |
| 2017/0151493 A1* | 6/2017 | Luo | A63F 7/0664 |
| 2017/0340949 A1* | 11/2017 | Tsai | A63B 67/04 |
| 2019/0091535 A1* | 3/2019 | DeCarlo | A63B 69/00 |
| 2020/0288111 A1* | 9/2020 | Sheng | H04N 13/117 |

* cited by examiner

*Primary Examiner* — El Hadji M Sall (57) ABSTRACT

Disclosed are a basketball video interaction method, device, intelligent basketball stand and storage medium. The method includes: judging whether a consent connection instruction sent by a target intelligent basketball stand is received; establishing a connection with the target intelligent basketball stand if the consent connection instruction sent by the target intelligent basketball stand is received; collecting a local basketball video, sending the local basketball video to the target intelligent basketball stand, and receiving a target end basketball video sent by the target intelligent basketball stand; and playing and displaying the target end basketball video locally. Communication interconnection between a local intelligent basketball stand and the target intelligent basketball stand is realized; function diversification of the basketball stand is realized; and collected basketball videos can be transmitted between intelligent basketball stands, so that the target end basketball video of the target intelligent basketball stand can be viewed in real time.

10 Claims, 2 Drawing Sheets

BASKETBALL VIDEO INTERACTION METHOD AND DEVICE, INTELLIGENT BASKETBALL STAND AND STORAGE MEDIUM

CROSS REFERENCE TO RELATED APPLICATIONS

The present application claims the benefit of Chinese Patent Application No. 201911215227.7 filed on Dec. 2, 2019, the contents of which are incorporated herein by reference in their entirety.

FIELD OF THE INVENTION

The present disclosure relates to the technical field of intelligent equipment, and in particular, to a basketball video interaction method, a basketball video interaction device, an intelligent basketball stand and a storage medium.

BACKGROUND OF THE INVENTION

At present, the common installation place for a basketball stand includes a public outdoor basketball court, a public indoor basketball court, or a private basketball court, etc. The existing basketball stands are generally used as sports equipment only, and there are also some intelligent basketball stands that can record the hitting position of the shot basketball on the basketball board through a sensor on the basketball stand panel. That is, the existing basketball stand has a single function and cannot communicate with other terminals, so that the data such as audio and video cannot be transmitted therebetween.

SUMMARY OF THE INVENTION

Embodiments of the present disclosure provide a basketball video interaction method, a basketball video interaction device, an intelligent basketball stand and a storage medium. The present disclosure aims to solve the problem that in existing technologies, the basketball stand is only used for sports equipment, has a single function, and cannot communicate with other terminals, so that data such as audio and video cannot be transmitted therebetween.

According to a first aspect, an embodiment of the present disclosure provides a basketball video interaction method, which is applied to a host of an intelligent basketball stand that is capable of performing a data interaction with another same intelligent basketball stand, and the interaction method comprises:

judging whether a consent connection instruction sent by a target intelligent basketball stand is received;

establishing a connection with the target intelligent basketball stand if the consent connection instruction sent by the target intelligent basketball stand is received;

collecting a local basketball video, sending the local basketball video to the target intelligent basketball stand, and receiving a target end basketball video sent by the target intelligent basketball stand; and playing and displaying the target end basketball video locally.

According to a second aspect, an embodiment of the present disclosure provides a basketball video interaction device, configured in a host of an intelligent basketball stand that is capable of performing a data interaction with another same intelligent basketball stand. The interaction device comprises units for implementing the basketball video interaction method as described in the first aspect above.

According to a third aspect, an embodiment of the present disclosure further provides an intelligent basketball stand. The intelligent basketball stand comprises a host comprising a memory, a processor, and a computer program stored on the memory and executable on the processor. The processor implements, when executing the computer program, the basketball video interaction method as described in the first aspect above.

According to a fourth aspect, an embodiment of the present disclosure further provides a computer readable storage medium. A computer program is stored in the computer readable storage medium, and when executed by a processor, the computer program causes the processor to implement the basketball video interaction method as described in the first aspect above.

Embodiments of the present disclosure provide a basketball video interaction method, a basketball video interaction device, an intelligent basketball stand and a storage medium. The method includes: judging whether a consent connection instruction sent by a target intelligent basketball stand is received; establishing a connection with the target intelligent basketball stand if the consent connection instruction sent by the target intelligent basketball stand is received; collecting a local basketball video, sending the local basketball video to the target intelligent basketball stand, and receiving a target end basketball video sent by the target intelligent basketball stand; and playing and displaying the target end basketball video locally. Communication interconnection between a local intelligent basketball stand and the target intelligent basketball stand is realized; function diversification of the basketball stand is realized; and collected basketball videos can be transmitted between intelligent basketball stands.

BRIEF DESCRIPTION OF THE DRAWINGS

In order to more clearly illustrate technical solutions in embodiments of the present disclosure, accompanying drawings to be used in descriptions of the embodiments will be briefly introduced below. Obviously, the accompanying drawings in the following descriptions illustrate some embodiments of the present disclosure, and for those of ordinary skill in the art, other accompanying drawings can also be obtained based on these accompanying drawings without any creative work.

DETAILED DESCRIPTION OF EMBODIMENTS

A clear and complete description of technical solutions in embodiments of the present disclosure will be provided below in combination with accompanying drawings in the embodiments of the present disclosure. Obviously, the described embodiments are part of the embodiments of the present disclosure, rather than all of them. Based on the embodiments of the present disclosure, all other embodiments obtained by those of ordinary skill in the art without any creative work shall fall within the protection scope of the present disclosure.

It should be understood that when used in the present description and the appended claims, the terms "comprising" and "including" indicate presence of the described features, wholes, steps, operations, elements and/or components, but do not exclude presence or addition of one or more other features, wholes, steps, operations, elements, components and/or combinations thereof.

It should also be understood that the terms used in the description of the present disclosure are only for the purpose of describing particular embodiments, rather than limiting the present disclosure. As used in the description and the appended claims in the present disclosure, the singular forms "a", "an" and "the" are intended to include the plural forms as well, unless the context clearly indicates otherwise.

It should also be further understood that the term "and/or" used in the description and the appended claims in the present disclosure refers to any combination of one or more of the items listed in association and all possible combinations thereof, and these combinations are included.

In order to understand the technical solutions of the present disclosure more clearly, a detailed introduction is made below to the intelligent basketball stand.

A main structure of an intelligent basketball stand in the present disclosure is the same as that of the existing basketball stand, and it also includes a basketball stand base, a basketball stand support arranged on the basketball stand base, a basketball stand panel fixedly arranged on the top of the basketball stand support, and a basket fixed on the basketball stand panel. The intelligent basketball stand in the present disclosure is further provided thereon with at least one camera (for collecting a video of a user playing basketball, preferably a 360-degree panoramic camera), a touch screen, a basketball stand power supply, a host fixed in the basketball stand or in the basketball stand base. The host is internally equipped with a microprocessor and a wireless communication module (such as a 5G communication module and a low-power-consumption Bluetooth module). The camera, the touch screen and the basketball stand power supply are all connected with the host. In specific implementation, a sensor for verifying a user identity, such as a fingerprint sensor and the like, may also be arranged on the basketball stand support, and the sensor is also connected with the host.

In the present disclosure, since a camera is arranged in the intelligent basketball stand, the intelligent basketball stand can collect the video of the user playing basketball in real time and can also be networked and interconnected with other intelligent basketball stands through the wireless communication module so as to transmit data such as audio and video to each other.

Figure 1:
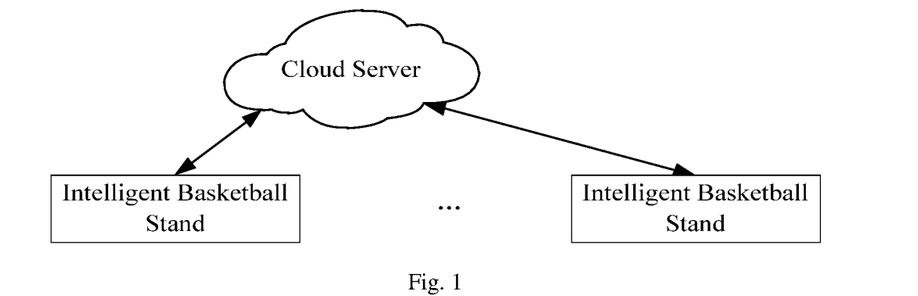
FIG. 1 is a schematic diagram of an application scenario for a basketball video interaction method provided by an embodiment of the present disclosure.
Figure 2:
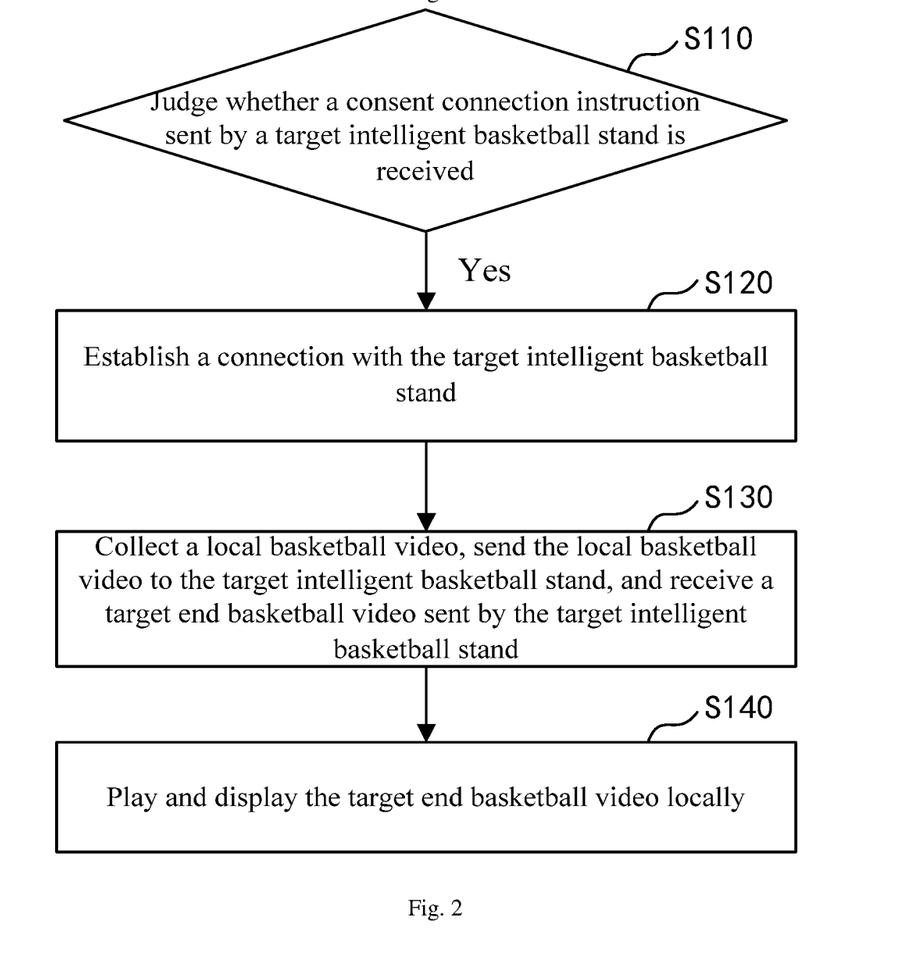
FIG. 2 is a schematic flowchart of the basketball video interaction method provided by the embodiment of the present disclosure.

Please refer to FIG. 1 and FIG. 2. FIG. 1 is a schematic diagram of an application scenario for a basketball video interaction method provided by an embodiment of the present disclosure. FIG. 2 is a schematic flowchart of the basketball video interaction method provided by the embodiment of the present disclosure. The basketball video interaction method is applied to the host of the intelligent basketball stand, and the method is executed by application software installed in the host of the intelligent basketball stand.

As shown in FIG. 2, the method includes steps S110-S140.

At step S110, it is judged whether a consent connection instruction sent by a target intelligent basketball stand is received.

In the present embodiment, for example, when a user installs the intelligent basketball stand in a private basketball court, a connection request may be sent to other intelligent basketball stands, and when the connection request is sent, it is detected in real time whether a consent connection instruction sent by a target intelligent basketball stand is received.

In an embodiment, as a first embodiment of matching a local intelligent basketball stand with a target intelligent basketball stand, before the step S110, the method includes:

judging whether a cloud server connection instruction is detected;

receiving a list of current online accounts sent by a cloud server if the cloud server connection instruction is detected;

obtaining information of a current account corresponding to the intelligent basketball stand, and obtaining a target matching account corresponding to the information of the current account in the list of current online accounts according to a preset account matching strategy, wherein the account matching strategy is used for calculating a similarity between information of respective accounts and the information of the current account, and selecting a corresponding target matching account having a maximum similarity with the information of the current account; and generating a connection request according to the target matching account, and sending the connection request to the target intelligent basketball stand corresponding to the target matching account.

In the present embodiment, a user interaction interface of an installed basketball stand online interconnection application program may be displayed on a touch screen of the intelligent basketball stand, and virtual operation buttons such as user login, connection to the cloud server and the like are at least arranged on the user interaction interface. When the virtual operation button of user login is clicked, and after login is made with a successful verification by entering an account and a password of a user, fingerprint verification, face recognition and the like, if it is detected at this time that the user clicks the virtual operation button of connection to the cloud server, the cloud server connection instruction is triggered. At this time, after detecting the cloud server connection instruction, the local intelligent basketball stand interconnects with the cloud server to thereby obtain the list of current online accounts sent by the cloud server. If no cloud server connection instruction is detected, step S110 is performed.

After the user clicks the user login on the local intelligent basketball stand, the cloud server will also add the information of the current account of the local intelligent basketball stand to the list of current online accounts. Moreover, information of respective accounts in the list of current online accounts will include at least user ID, user nickname, age, gender, height, basketball level (such as one of levels 1-10) and other details. Therefore, at this time, after receiving the list of current online accounts of the cloud server, the local intelligent basketball stand obtains a target matching account corresponding to the information of the current account from the list of current online accounts according to a preset account matching strategy. The account matching strategy is used for calculating the similarity between information of respective accounts and the information of the current account and selecting the corresponding target matching account having the maximum similarity with the information of the current account. More specifically, according to specific values of four fields, i.e., age, gender, height, and basketball level, of the information of the current account and a respective weight corresponding to each field, a user's athletic ability parameter value corresponding to the information of the current account is calculated. For example, for a user, the age is 23 years old, gender being male, height being 175 cm, basketball level value being level 6. At this time, after the above four values are normalized or quantized, parameters are as follows: the age parameter 23/40=0.575, the gender parameter 1, the height parameter 175/200=0.875, and the basketball level parameter 6/10=0.6. Since it is preset that the weight corresponding to the age parameter is 0.2, the weight corresponding to the gender parameter being 0.1, the weight corresponding to the height parameter being 0.2, the weight corresponding to the basketball level parameter being 0.5, the user's athletic ability parameter value corresponding to the information of the current account is 0.575*0.2+1*0.1+0.875*0.2+0.6*0.5=0.69. Similarly, the same calculation method is used to calculate a user's athletic ability parameter value corresponding to information of respective accounts in the list of current online accounts, and an account whose value of information is closest to the value of 0.69 is selected as the target matching account.

At this time, the local intelligent basketball stand correspondingly sends a connection request according to the target matching account, and sends the connection request to the target intelligent basketball stand corresponding to the target matching account. In this way, intelligent matching with a target user so as to invite the target intelligent basketball stand corresponding to the target matching account to perform interconnection can be realized.

In an embodiment, as a second embodiment of matching the local intelligent basketball stand with the target intelligent basketball stand, before the step S110, the method includes:

judging whether a cloud server connection instruction is detected;

receiving a list of current online accounts sent by a cloud server if the cloud server connection instruction is detected;

judging whether an account selected instruction corresponding to the list of current online accounts is detected;

obtaining a target matching account corresponding to the account selected instruction if the account selected instruction corresponding to the list of current online accounts is detected; and generating a connection request according to the target matching account, and sending the connection request to the target intelligent basketball stand corresponding to the target matching account.

In the present embodiment, the difference from the first embodiment of matching the local intelligent basketball stand with the target intelligent basketball stand is that when the local intelligent basketball stand receives the list of current online accounts sent by the cloud server, the user may select one account in the list of current online accounts displayed on the touch screen of the local intelligent basketball stand as the target matching account. Similarly, at this time, the local intelligent basketball stand correspondingly sends a connection request according to the target matching account, and sends the connection request to the target intelligent basketball stand corresponding to the target matching account. In this way, independently selecting the target matching account by the user so as to invite the target intelligent basketball stand corresponding to the target matching account to perform interconnection can be realized. If no cloud server connection instruction is detected, step S110 is performed.

At step S120, a connection with the target intelligent basketball stand is established if the consent connection instruction sent by the target intelligent basketball stand is received.

In the present embodiment, if the local intelligent basketball stand sends a connection request to the target intelligent basketball stand and obtains a corresponding consent connection instruction, a connection is established between the local intelligent basketball stand and the target intelligent basketball stand to achieve an interconnection. After the connection is established between the local intelligent basketball stand and the target intelligent basketball stand, data can be transmitted therebetween to thereby achieve information exchange. If no consent connection instruction sent by the target intelligent basketball stand is received, step S110 is returned to after a preset waiting time with a value (such as 10 s) elapses.

At step S130, a local basketball video is collected and sent to the target intelligent basketball stand, and a target end basketball video sent by the target intelligent basketball stand is received.

In the present embodiment, the local intelligent basketball stand and the target intelligent basketball stand are both provided thereon with a camera (in specific implementation, in order to realize a 360-degree panoramic shooting of a video of a user playing basketball, multiple cameras may be set: for example, one of the cameras is installed on the top of the basketball stand panel, and a further camera may be installed in the middle of the basketball stand support to film in the direction of the user). At this time, if user A corresponding to the local intelligent basketball stand and user B corresponding to the target intelligent basketball stand agree on a spot shooting game, the local intelligent basketball stand used by the user A collects the video of the user A playing basketball (i.e., the local basketball video), and the target intelligent basketball stand used by the user B collects the video of the user B playing basketball (i.e., the target end basketball video). After collection of the local basketball video is completed, the local intelligent basketball stand sends the local basketball video to the target intelligent basketball stand, and receives the target end basketball video sent by the target intelligent basketball stand. Since videos of the two parties during the game are shot and transmitted to the intelligent basketball stand of each other, the two parties may watch the basketball video of each other in real time. A best scenario is that the user A and the user B take turns in the spot shooting. For example, the user A give 5 times of shooting first, and at this time the user B correspondingly watches the local basketball video collected and sent by the local intelligent basketball stand on the touch screen of the target intelligent basketball stand, so that the user B may watch the shooting process of the user A in real time. After the user A completes the 5 times of shooting, it is the user B's turn to give 5 times of shooting, and the user A correspondingly watches the target end basketball video collected and sent by the target intelligent basketball stand on the touch screen of the local intelligent basketball stand, so that the user A may watch the shooting process of the user B in real time. Based on this, the interconnection communication between intelligent basketball stands can be realized, and the mutual transmission of data such as video can be realized, so as to improve interactivity between users of different intelligent basketball stands.

At step S140, the target end basketball video is played and displayed locally.

In the present embodiment, when the local intelligent basketball stand receives the target end basketball video sent by the target intelligent basketball stand, a real-time playing may be carried out on the touch screen of the local intelligent basketball stand, so that the collected video of the target user is visually shown.

In an embodiment, after step S140, the method further includes:

performing a video splitting on the local basketball video to obtain a corresponding target initial image set;

obtaining multiple frames of video images from the target initial image set according to a preset interval value to serve as a target image set;

performing a face recognition on each frame of video image in the target image set, and obtaining user identity information corresponding to each frame of video image to obtain a user identity information set;

merging the same user identity information in the user identity information set to obtain a de-duplicated user identity information set;

judging whether the number of pieces of the user identity information in the de-duplicated user identity information set is greater than 1; and sending a pause notification message used for prompting a pause to the target intelligent basketball stand, if the number of pieces of the user identity information in the de-duplicated user identity information set is greater than 1.

In the present embodiment, after the local intelligent basketball stand collects the local basketball video, in order to determine whether the user corresponding to the local intelligent basketball stand invites other users to participate in playing basketball simultaneously to record the video, the multiple frames of video images from the target initial image set corresponding to the local basketball video may be obtained according to a preset interval number, and the preset interval number may be set to 8. Generally, a 1-second video may be split into 24 frames of images, so a local basketball video with a length of m seconds (m is a positive real number) may be split into 24 m video images. At this time, a first frame of video image may be selected as the starting point, and the $9^{th}$, $17^{th}$, . . . , $(1+8n)^{th}$ (where $1+8n \leq 24$ m, and the value of n is a positive integer) frames of video images are selected to form the target image set.

At this time, face recognition is carried out on each frame of video image in the target image set through a trained face recognition model (such as a convolutional neural network), and the user identity information corresponding to each frame of video image is obtained to get a user identity information set. If there is one face in the video image, the correspondingly obtained user identity information is the user identity unique identification code (such as an identification card number) of the user; if there is zero face in the video image, the correspondingly obtained user identity information is a null value; and if there are multiple faces in the video image (that is, the number of faces is greater than 1), the correspondingly obtained user identity information is multiple user identity unique identification codes.

After the user identity information corresponding to each frame of video image is obtained, if the same face image exists in each frame of video image and only this face image exists, a user identity information set (such as {XX1, XX1, XX1, . . . XX1}) is obtained. At this time, the same user identity information in the user identity information set is merged to obtain a de-duplicated user identity information set. For example, after the user identity information set {XX1, XX1, XX1, . . . XX1} is de-duplicated, an obtained de-duplicated user identity information set is {XX1}.

After that, it is judged whether the number of pieces of the user identity information in the de-duplicated user identity information set is greater than 1. If the number of pieces of the user identity information in the de-duplicated user identity information set is equal to 1, it means that there is only one user in the local basketball video correspondingly collected by the local intelligent basketball stand. At this time, there is no need to perform a task processing, and the target end basketball video may be continuously played. If the number of pieces of the user identity information in the de-duplicated user identity information set is greater than 1, it means that there are multiple users in the local basketball video correspondingly collected by the local intelligent basketball stand (for example, when the user A and the user B in the above example are in the spot shooting game with user C participating and playing basketball with the user A, at this time there may be a suspicious situation of playing for others). At this time, the local intelligent basketball stand may send the pause notification message used for prompting a pause to the target intelligent basketball stand. Through the real-time detection manner based on face recognition, the accurate number of participants can be monitored in real time to thereby determine whether a prompt message should be sent out in time.

In an embodiment, after obtaining multiple frames of video images from the target initial image set according to a preset interval value to serve as a target image set, the method further comprises:

performing a facial emotion recognition on each frame of video image in the target image set to obtain facial emotion recognition result values corresponding to each frame of video image in the target image set;

performing an averaging operation on the facial emotion recognition result values corresponding to each frame of video image in the target image set to obtain a corresponding average facial emotion recognition result value;

obtaining an emotion recognition result corresponding to the target image set according to the average facial emotion recognition result value and a pre-stored mapping list of the facial emotion recognition result value and the emotion recognition result; and obtaining a target audio data set, whose emotional label is the same as the emotion recognition result, from pre-stored multiple audio data sets, and playing the target audio data set.

In the present embodiment, after the target image set is obtained, in order to perform emotion recognition for the user corresponding to the local intelligent basketball stand, each frame of video image in the target image set may be firstly converted into a corresponding image feature vector, and then each image feature vector is input to a trained facial emotion recognition model (such as an expression classification and recognition model based on a deep learning library of Keras, and a cognitive service API provided by Microsoft Corporation may also realize facial emotion recognition).

Finally, the facial emotion recognition result value corresponding to each frame of video image in the target image set is obtained. For example, four facial emotion recognition results of sadness, anger, surprise, and happiness are predefined. The facial emotion recognition result value corresponding to sadness is 1; the facial emotion recognition result value corresponding to anger is 2; the facial emotion recognition result value corresponding to surprise is 3; and the facial emotion recognition result value corresponding to happiness is 4. At this time, for example, the target image set includes 5 target images with corresponding facial emotion recognition result values 3, 4, 4, 4 and 4, and the average facial emotion recognition result value is 3.8. Since a mapping list of the facial emotion recognition result value and the emotion recognition result is set in advance (each row of data in the emotion recognition result mapping list includes a facial emotion recognition result value and an emotion recognition result, which indicates that the facial emotion recognition result value corresponds to the emotion recognition result), by calling the mapping list of the facial emotion recognition result value and the emotion recognition result, it can be known that the emotion recognition result corresponding to the target image set is happiness.

Audio files with various labels are pre-stored in the local intelligent basketball stand. For example, a fourth audio set with an emotion label of happiness is stored; a third audio set with an emotion label of surprise is stored; a second audio set with an emotion label of anger is stored; and a first audio set with an emotion label of sadness is stored. Since the emotion recognition result corresponding to the target image set is happiness at this time, the fourth audio set with the emotion label of happiness is called and played. In this way, playing audio data intelligently according to the current emotion of the user can be realized. Similarly, it is also applicable if the audio data is replaced with video data.

In an embodiment, after step S130, the method further includes:

obtaining a current site temperature value and a current site humidity value collected;

performing a normalization processing on the current site temperature value to obtain a current site temperature normalization value corresponding to the current site temperature value;

summing the current site temperature normalization value and the current site humidity value to obtain a current site environment parameter value;

obtaining a site environment recognition result corresponding to the current site temperature value and the current site humidity value, according to the current site environment parameter value and a pre-stored mapping list of the environment parameter value and the site environment recognition result; and obtaining a target audio data set, whose site environment label is the same as the site environment recognition result, from pre-stored multiple audio data sets, and playing the target audio data set.

In the present embodiment, as another specific embodiment of selecting the target audio data set for playing, the current site environment parameter value is determined according to the temperature and humidity of the current site. For example, the local intelligent basketball stand is further provided thereon with a temperature and humidity sensor (such as the SHT31 sensor). The current site temperature value of 30° C. and the current site humidity value of 60% are collected, and a preset temperature normalization strategy (such as the current site temperature value/40) is called at this time to perform a normalization processing on the current site temperature value to obtain a current site temperature normalization value of 0.75 corresponding to the current site temperature value of 30° C. The current site temperature normalization value of 0.75 and the current site humidity value of 0.6 are summed to obtain a current site environment parameter value of 1.35.

Since a mapping list of the environment parameter value and the site environment recognition result is set in advance (each row of data in the mapping list of the environment parameter value and the site environment recognition result includes an environment parameter value and a site environment recognition result, which indicates that the environment parameter value corresponds to the site environment recognition result), by calling the mapping list of the environment parameter value and the site environment recognition result, it can be known that the site environment recognition result corresponding to the current site temperature value and the current site humidity value is dryness-heat.

Audio files with various labels are pre-stored in the local intelligent basketball stand. For example, a sixth audio set with a site environment label of dryness-heat is stored, and a fifth audio set with a site environment label of cool is stored. Since the site environment recognition result corresponding to the current site temperature value and the current site humidity value is dryness-heat at this time, the sixth audio set with the site environment label of dryness-heat is called and played. In this way, playing the audio data intelligently according to the current site temperature value and the current site humidity value can be realized. Similarly, it is also applicable if the audio data is replaced with video data.

In an embodiment, after step S130, the method further includes:

receiving current motion data uploaded by a smart wearable bracelet of a user, wherein the current motion data is the number of motion steps, an average motion heart rate or a motion energy consumption value;

sending a motion data acquisition instruction of the list of current online accounts to the cloud server;

obtaining online user motion data corresponding to respective online accounts in the list of current online accounts correspondingly sent by the cloud server according to the motion data acquisition instruction;

arranging the current motion data and the online user motion data corresponding to respective online accounts in a descending order to obtain a sorted user motion data list; and playing and displaying the sorted user motion data list locally.

In the present embodiment, the local intelligent basketball stand can also perform a data interaction with the smart wearable bracelet (mainly used for step counting, heart rate measurement, and motion energy consumption estimation) through a wireless communication module. For example, user A corresponding to the local intelligent basketball stand is wearing a smart wearable bracelet 1. If the user A clicks a connection button for connecting with the intelligent basketball stand on the smart wearable bracelet 1, the smart wearable bracelet 1 sends the measured current motion data to the local intelligent basketball stand. The current motion data is the number of motion steps, an average motion heart rate or a motion energy consumption value. At this time, when the user A corresponding to the local intelligent basketball stand needs to know motion data of other online users, the motion data acquisition instruction of the list of current online accounts is triggered after a virtual button of obtaining the motion data ranking on the touch screen is clicked; and the local intelligent basketball stand sends the motion data acquisition instruction of the list of current online accounts to the cloud server.

Then, the online user motion data corresponding to respective online accounts in the list of current online accounts correspondingly sent by the cloud server according to the motion data acquisition instruction is obtained. At this time, the current motion data and the online user motion data corresponding to respective online accounts are arranged in a descending order in the local intelligent basketball stand to obtain a sorted user motion data list. Finally, the sorted user motion data list are played and displayed locally on the touch screen. In this way, intelligently obtaining the sorted data can be realized, which is convenient for the user to view visually.

The method realizes communication interconnection between the local intelligent basketball stand and the target intelligent basketball stand, realizes function diversification of the basketball stand, and realizes mutual transmission of collected basketball videos.

An embodiment of the present disclosure further provides a basketball video interaction device, which is configured in a host of an intelligent basketball stand to implement any embodiment of the aforesaid basketball video interaction method. Specifically, please refer to FIG. 3, and FIG. 3 is a schematic block diagram of a basketball video interaction device provided by an embodiment of the present disclosure.

Figure 3:
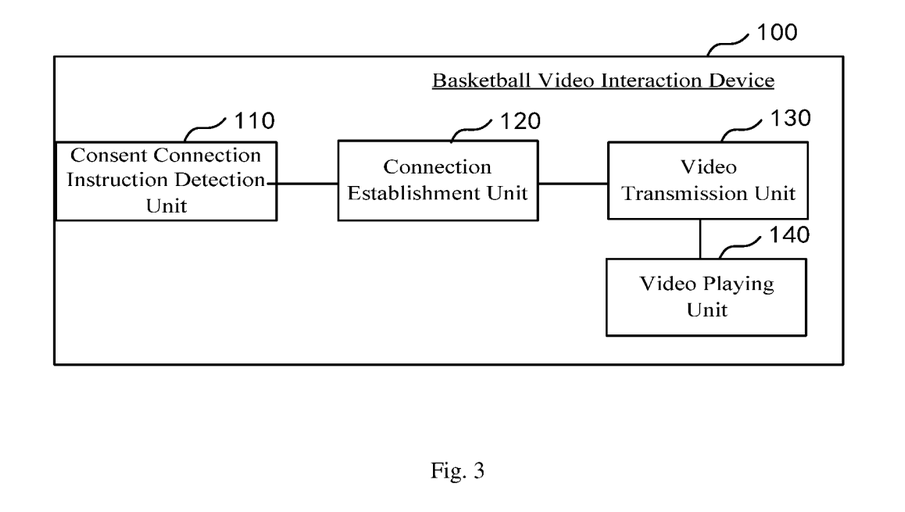
FIG. 3 is a schematic block diagram of a basketball video interaction device provided by an embodiment of the present disclosure.

As shown in FIG. 3, the basketball video interaction device 100 includes a consent connection instruction detection unit 110, a connection establishment unit 120, a video transmission unit 130 and a video playing unit 140.

The consent connection instruction detection unit 110 is configured to judge whether a consent connection instruction sent by the target intelligent basketball stand is received.

In the present embodiment, for example, when a user installs the intelligent basketball stand in a private basketball court, a connection request may be sent to other intelligent basketball stands, and when the connection request is sent, it is detected in real time whether a consent connection instruction sent by a target intelligent basketball stand is received.

In an embodiment, the basketball video interaction device 100 further includes:

a first cloud server connection detection unit, which is configured to judge whether a cloud server connection instruction is detected;

a first current online account list obtaining unit, which is configured to receive a list of current online accounts sent by a cloud server if the cloud server connection instruction is detected;

a first account matching unit, which is configured to obtain information of a current account corresponding to the intelligent basketball stand, and obtain a target matching account corresponding to the information of the current account in the list of current online accounts according to a preset account matching strategy, wherein the account matching strategy is used for calculating a similarity between information of respective accounts and information of the current account, and selecting a corresponding target matching account having a maximum similarity with the information of the current account; and a first connection request sending unit, which is configured to generate a connection request according to the target matching account, and send the connection request to the target intelligent basketball stand corresponding to the target matching account.

In the present embodiment, a user interaction interface of an installed basketball stand online interconnection application program may be displayed on a touch screen of the intelligent basketball stand, and virtual operation buttons such as user login, connection to the cloud server and the like are at least arranged on the user interaction interface. When the virtual operation button of user login is clicked, and after login is made with a successful verification by entering an account and a password of a user, fingerprint verification, face recognition and the like, if it is detected at this time that the user clicks the virtual operation button of connection to the cloud server, the cloud server connection instruction is triggered. At this time, after detecting the cloud server connection instruction, the local intelligent basketball stand interconnects with the cloud server to thereby obtain the list of current online accounts sent by the cloud server.

After the user clicks the user login on the local intelligent basketball stand, the cloud server will also add the information of the current account of the local intelligent basketball stand to the list of current online accounts. Moreover, information of respective accounts in the list of current online accounts will include at least user ID, user nickname, age, gender, height, basketball level (such as one of levels 1-10) and other details. Therefore, at this time, after receiving the list of current online accounts of the cloud server, the local intelligent basketball stand obtains a target matching account corresponding to the information of the current account from the list of current online accounts according to a preset account matching strategy. The account matching strategy is used for calculating the similarity between information of respective accounts and the information of the current account and selecting the corresponding target matching account having the maximum similarity with the information of the current account. More specifically, according to specific values of four fields, i.e., age, gender, height, and basketball level, of the information of the current account and a respective weight corresponding to each field, a user's athletic ability parameter value corresponding to the information of the current account is calculated. For example, for a user, the age is 23 years old, gender being male, height being 175 cm, basketball level value being level 6. At this time, after the above four values are normalized or quantized, parameters are as follows: the age parameter $23/40=0.575$, the gender parameter 1, the height parameter $175/200=0.875$, and the basketball level parameter $6/10=0.6$. Since it is preset that the weight corresponding to the age parameter is 0.2, the weight corresponding to the gender parameter being 0.1, the weight corresponding to the height parameter being 0.2, the weight corresponding to the basketball level parameter being 0.5, the user's athletic ability parameter value corresponding to the information of the current account is $0.575*0.2+1*0.1+0.875*0.2+0.6*0.5=0.69$. Similarly, the same calculation method is used to calculate a user's athletic ability parameter value corresponding to information of respective accounts in the list of current online accounts, and an account whose value of information is closest to the value of 0.69 is selected as the target matching account.

At this time, the local intelligent basketball stand correspondingly sends a connection request according to the target matching account, and sends the connection request to the target intelligent basketball stand corresponding to the target matching account. In this way, intelligent matching with a target user so as to invite the target intelligent basketball stand corresponding to the target matching account to perform interconnection can be realized.

In an embodiment, as a second embodiment of matching the local intelligent basketball stand with the target intelligent basketball stand, the basketball video interaction device 100 further includes:

a second cloud server connection detection unit, which is configured to judge whether a cloud server connection instruction is detected;

a second current online account list obtaining unit, which is configured to receive a list of current online accounts sent by a cloud server if the cloud server connection instruction is detected;

an account selected judging unit, which is configured to judge whether an account selected instruction corresponding to the list of current online accounts is detected;

a second account matching unit, which is configured to obtain a target matching account corresponding to the account selected instruction if the account selected instruction corresponding to the list of current online accounts is detected; and a second connection request sending unit, which is configured to generate a connection request according to the target matching account, and send the connection request to the target intelligent basketball stand corresponding to the target matching account.

In the present embodiment, the difference from the first embodiment of matching the local intelligent basketball stand with the target intelligent basketball stand is that when the local intelligent basketball stand receives the list of current online accounts sent by the cloud server, the user may select one account in the list of current online accounts displayed on the touch screen of the local intelligent basketball stand as the target matching account. Similarly, at this time, the local intelligent basketball stand correspondingly sends a connection request according to the target matching account, and sends the connection request to the target intelligent basketball stand corresponding to the target matching account. In this way, independently selecting the target matching account by the user so as to invite the target intelligent basketball stand corresponding to the target matching account to perform interconnection can be realized.

A connection establishment unit 120 is configured to establish a connection with the target intelligent basketball stand if the consent connection instruction sent by the target intelligent basketball stand is received.

In the present embodiment, if the local intelligent basketball stand sends a connection request to the target intelligent basketball stand and obtains a corresponding consent connection instruction, a connection is established between the local intelligent basketball stand and the target intelligent basketball stand to achieve an interconnection. After the connection is established between the local intelligent basketball stand and the target intelligent basketball stand, data can be transmitted therebetween to thereby achieve information exchange.

A video transmission unit 130 is configured to collect a local basketball video, send the local basketball video to the target intelligent basketball stand, and receive a target end basketball video sent by the target intelligent basketball stand.

In the present embodiment, the local intelligent basketball stand and the target intelligent basketball stand are both provided thereon with a camera (in specific implementation, in order to realize a 360-degree panoramic shooting of a video of a user playing basketball, multiple cameras may be set: for example, one of the cameras is installed on the top of the basketball stand panel, and a further camera may be installed in the middle of the basketball stand support to film in the direction of the user). At this time, if user A corresponding to the local intelligent basketball stand and user B corresponding to the target intelligent basketball stand agree on a spot shooting game, the local intelligent basketball stand used by the user A collects the video of the user A playing basketball (i.e., the local basketball video), and the target intelligent basketball stand used by the user B collects the video of the user B playing basketball (i.e., the target end basketball video). After collection of the local basketball video is completed, the local intelligent basketball stand sends the local basketball video to the target intelligent basketball stand, and receives the target end basketball video sent by the target intelligent basketball stand. Since videos of the two parties during the game are shot and transmitted to the intelligent basketball stand of each other, the two parties may watch the basketball video of each other in real time. A best scenario is that the user A and the user B take turns in the spot shooting. For example, the user A give 5 times of shooting first, and at this time the user B correspondingly watches the local basketball video collected and sent by the local intelligent basketball stand on the touch screen of the target intelligent basketball stand, so that the user B may watch the shooting process of the user A in real time. After the user A completes the 5 times of shooting, it is the user B's turn to give 5 times of shooting, and the user A correspondingly watches the target end basketball video collected and sent by the target intelligent basketball stand on the touch screen of the local intelligent basketball stand, so that the user A may watch the shooting process of the user B in real time. Based on this, the interconnection communication between intelligent basketball stands can be realized, and the mutual transmission of data such as video can be realized, so as to improve interactivity between users of different intelligent basketball stands.

A video playing unit 140 is configured to play and display the target end basketball video locally.

In the present embodiment, when the local intelligent basketball stand receives the target end basketball video sent by the target intelligent basketball stand, a real-time playing may be carried out on the touch screen of the local intelligent basketball stand, so that the collected video of the target user is visually shown.

In an embodiment, the basketball video interaction device 100 further includes:

a video splitting unit, which is configured to perform a video splitting on the local basketball video to obtain a corresponding target initial image set;

a target image set obtaining unit, which is configured to obtain multiple frames of video images from the target initial image set according to a preset interval value to serve as a target image set;

a face recognition unit, which is configured to perform a face recognition on each frame of video image in the target image set, and obtain user identity information corresponding to each frame of video image to obtain a user identity information set;

an information de-duplication unit, which is configured to merge the same user identity information in the user identity information set to obtain a de-duplicated user identity information set;

a unit of judging the number of pieces of user information, which is configured to judge whether the number of pieces of the user identity information in the de-duplicated user identity information set is greater than 1; and a prompt message sending unit, which is configured to send a pause notification message used for prompting a pause to the target intelligent basketball stand, if the number of pieces of the user identity information in the de-duplicated user identity information set is greater than 1.

In the present embodiment, after the local intelligent basketball stand collects the local basketball video, in order to determine whether the user corresponding to the local intelligent basketball stand invites other users to participate in playing basketball simultaneously to record the video, the multiple frames of video images from the target initial image set corresponding to the local basketball video may be obtained according to a preset interval number, and the preset interval number may be set to 8. Generally, a 1-second video may be split into 24 frames of images, so a local basketball video with a length of m seconds (m is a positive real number) may be split into 24 m video images. At this time, a first frame of video image may be selected as the starting point, and the $9^{th}$, $17^{th}$, . . . , $(1+8n)^{th}$ (where $1+8n\leq24$ m, and the value of n is a positive integer) frames of video images are selected to form the target image set.

At this time, face recognition is carried out on each frame of video image in the target image set through a trained face recognition model (such as a convolutional neural network), and the user identity information corresponding to each frame of video image is obtained to get a user identity information set. If there is one face in the video image, the correspondingly obtained user identity information is the user identity unique identification code (such as an identification card number) of the user; if there is zero face in the video image, the correspondingly obtained user identity information is a null value; and if there are multiple faces in the video image (that is, the number of faces is greater than 1), the correspondingly obtained user identity information is multiple user identity unique identification codes.

After the user identity information corresponding to each frame of video image is obtained, if the same face image exists in each frame of video image and only this face image exists, a user identity information set (such as {XX1, XX1, XX1, . . . XX1}) is obtained. At this time, the same user identity information in the user identity information set is merged to obtain a de-duplicated user identity information set. For example, after the user identity information set {XX1, XX1, XX1, . . . XX1} is de-duplicated, an obtained de-duplicated user identity information set is {XX1}.

After that, it is judged whether the number of pieces of the user identity information in the de-duplicated user identity information set is greater than 1. If the number of pieces of the user identity information in the de-duplicated user identity information set is equal to 1, it means that there is only one user in the local basketball video correspondingly collected by the local intelligent basketball stand. At this time, there is no need to perform a task processing, and the target end basketball video may be continuously played. If the number of pieces of the user identity information in the de-duplicated user identity information set is greater than 1, it means that there are multiple users in the local basketball video correspondingly collected by the local intelligent basketball stand (for example, when the user A and the user B in the above example are in the spot shooting game with user C participating and playing basketball with the user A, at this time there may be a suspicious situation of playing for others). At this time, the local intelligent basketball stand may send the pause notification message used for prompting a pause to the target intelligent basketball stand. Through the real-time detection manner based on face recognition, the accurate number of participants can be monitored in real time to thereby determine whether a prompt message should be sent out in time.

In an embodiment, the basketball video interaction device 100 further includes:

a facial emotion recognition unit, which is configured to perform a facial emotion recognition on each frame of video image in the target image set to obtain facial emotion recognition result values corresponding to each frame of video image in the target image set;

an average facial emotion recognition result value obtaining unit, which is configured to perform an averaging operation on the facial emotion recognition result values corresponding to each frame of video image in the target image set to obtain a corresponding average facial emotion recognition result value;

an emotion recognition result obtaining unit, which is configured to obtain an emotion recognition result corresponding to the target image set according to the average facial emotion recognition result value and a pre-stored mapping list of the facial emotion recognition result value and the emotion recognition result; and a first target audio data set screening unit, which is configured to obtain a target audio data set, whose emotional label is the same as the emotion recognition result, from pre-stored multiple audio data sets, and play the target audio data set.

In the present embodiment, after the target image set is obtained, in order to perform emotion recognition for the user corresponding to the local intelligent basketball stand, each frame of video image in the target image set may be firstly converted into a corresponding image feature vector, and then each image feature vector is input to a trained facial emotion recognition model (such as an expression classification and recognition model based on a deep learning library of Keras, and a cognitive service API provided by Microsoft Corporation may also realize facial emotion recognition).

Finally, the facial emotion recognition result value corresponding to each frame of video image in the target image set is obtained. For example, four facial emotion recognition results of sadness, anger, surprise, and happiness are predefined. The facial emotion recognition result value corresponding to sadness is 1; the facial emotion recognition result value corresponding to anger is 2; the facial emotion recognition result value corresponding to surprise is 3; and the facial emotion recognition result value corresponding to happiness is 4. At this time, for example, the target image set includes 5 target images with corresponding facial emotion recognition result values 3, 4, 4, 4 and 4, and the average facial emotion recognition result value is 3.8. Since a mapping list of the facial emotion recognition result value and the emotion recognition result is set in advance (each row of data in the mapping list of the facial emotion recognition result value and the emotion recognition result includes a facial emotion recognition result value and an emotion recognition result, which indicates that the facial emotion recognition result value corresponds to the emotion recognition result), by calling the mapping list of the facial emotion recognition result value and the emotion recognition result, it can be known that the emotion recognition result corresponding to the target image set is happiness.

Audio files with various labels are pre-stored in the local intelligent basketball stand. For example, a fourth audio set with an emotion label of happiness is stored; a third audio set with an emotion label of surprise is stored; a second audio set with an emotion label of anger is stored; and a first audio set with an emotion label of sadness is stored. Since the emotion recognition result corresponding to the target image set is happiness at this time, the fourth audio set with the emotion label of happiness is called and played. In this way, playing audio data intelligently according to the current emotion of the user can be realized. Similarly, it is also applicable if the audio data is replaced with video data.

In an embodiment, the basketball video interaction device 100 further includes:

a temperature and humidity acquisition unit, which is configured to obtain a current site temperature value and a current site humidity value collected;

a normalization processing unit, which is configured to perform a normalization processing on the current site temperature value to obtain a current site temperature normalization value corresponding to the current site temperature value;

a parameter summing unit, which is configured to sum the current site temperature normalization value and the current site humidity value to obtain a current site environment parameter value;

a site environment recognition result obtaining unit, which is configured to obtain a site environment recognition result corresponding to the current site temperature value and the current site humidity value, according to the current site environment parameter value and a pre-stored mapping list of the environment parameter value and the site environment recognition result; and a second target audio data set screening unit, which is configured to obtain a target audio data set, whose site environment label is the same as the site environment recognition result, from pre-stored multiple audio data sets, and play the target audio data set.

In the present embodiment, as another specific embodiment of selecting the target audio data set for playing, the current site environment parameter value is determined according to the temperature and humidity of the current site. For example, the local intelligent basketball stand is further provided thereon with a temperature and humidity sensor (such as the SHT31 sensor). The current site temperature value of 30° C. and the current site humidity value of 60% are collected, and a preset temperature normalization strategy (such as the current site temperature value/40) is called at this time to perform a normalization processing on the current site temperature value to obtain a current site temperature normalization value of 0.75 corresponding to the current site temperature value of 30° C. The current site temperature normalization value of 0.75 and the current site humidity value of 0.6 are summed to obtain a current site environment parameter value of 1.35.

Since a mapping list of the environment parameter value and the site environment recognition result is set in advance (each row of data in the mapping list of the environment parameter value and the site environment recognition result includes an environment parameter value and a site environment recognition result, which indicates that the environment parameter value corresponds to the site environment recognition result), by calling the mapping list of the environment parameter value and the site environment recognition result, it can be known that the site environment recognition result corresponding to the current site temperature value and the current site humidity value is dryness-heat.

Audio files with various labels are pre-stored in the local intelligent basketball stand. For example, a sixth audio set with a site environment label of dryness-heat is stored, and a fifth audio set with a site environment label of cool is stored. Since the site environment recognition result corresponding to the current site temperature value and the current site humidity value is dryness-heat at this time, the sixth audio set with the site environment label of dryness-heat is called and played. In this way, playing the audio data intelligently according to the current site temperature value and the current site humidity value can be realized. Similarly, it is also applicable if the audio data is replaced with video data.

In an embodiment, the basketball video interaction device 100 further includes:

a current motion data receiving unit, which is configured to receive current motion data uploaded by a smart wearable bracelet of a user, wherein the current motion data is the number of motion steps, an average motion heart rate or a motion energy consumption value;

a motion data acquisition instruction sending unit, which is configured to send a motion data acquisition instruction of the list of current online accounts to the cloud server;

an online user motion data obtaining unit, which is configured to obtain online user motion data corresponding to respective online accounts in the list of current online accounts correspondingly sent by the cloud server according to the motion data acquisition instruction;

a descending order arrangement unit, which is configured to arrange the current motion data and the online user motion data corresponding to respective online accounts in a descending order to obtain a sorted user motion data list; and a sorting list display unit, which is configured to play and display the sorted user motion data list locally.

In the present embodiment, the local intelligent basketball stand can also perform a data interaction with the smart wearable bracelet (mainly used for step counting, heart rate measurement, and motion energy consumption estimation) through a wireless communication module. For example, user A corresponding to the local intelligent basketball stand is wearing a smart wearable bracelet 1. If the user A clicks a connection button for connecting with the intelligent basketball stand on the smart wearable bracelet 1, the smart wearable bracelet 1 sends the measured current motion data to the local intelligent basketball stand. The current motion data is the number of motion steps, an average motion heart rate or a motion energy consumption value. At this time, when the user A corresponding to the local intelligent basketball stand needs to know motion data of other online users, the motion data acquisition instruction of the list of current online accounts is triggered after a virtual button of obtaining the motion data ranking on the touch screen is clicked; and the local intelligent basketball stand sends the motion data acquisition instruction of the list of current online accounts to the cloud server.

Then, the online user motion data corresponding to respective online accounts in the list of current online accounts correspondingly sent by the cloud server according to the motion data acquisition instruction is obtained. At this time, the current motion data and the online user motion data corresponding to respective online accounts are arranged in a descending order in the local intelligent basketball stand to obtain a sorted user motion data list. Finally, the sorted user motion data list are played and displayed locally on the touch screen. In this way, intelligently obtaining the sorted data can be realized, which is convenient for the user to view visually.

The device realizes the communication interconnection between the local intelligent basketball stand and the target intelligent basketball stand, realizes function diversification of the basketball stand, and realizes mutual transmission of collected basketball videos.

Figure 4:
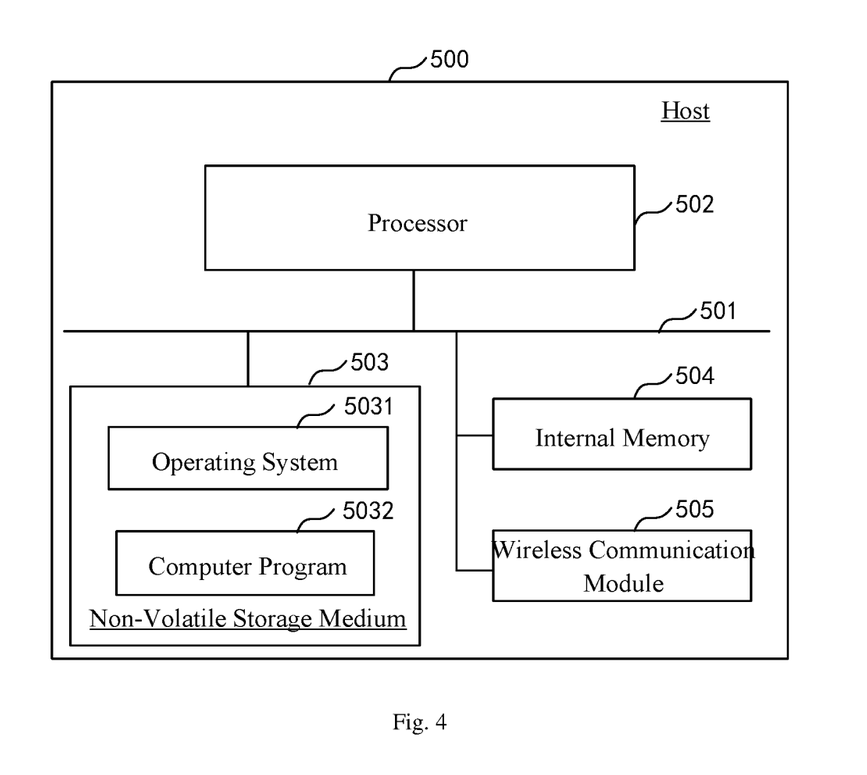
FIG. 4 is a schematic block diagram of an intelligent basketball stand provided by an embodiment of the present disclosure.

The above-mentioned basketball video interaction device may be implemented in the form of a computer program, which may run on an intelligent basketball stand as shown in FIG. 4.

Please refer to FIG. 4. FIG. 4 is a schematic block diagram of a host of an intelligent basketball stand provided by an embodiment of the present disclosure. The host may be a server, and the server may be an independent server, or a server cluster composed of multiple servers.

Referring to FIG. 4, the host 500 of the intelligent basketball stand includes a processor 502, a memory, and a wireless communication module 505 connected through a system bus 501. The memory may include a non-volatile storage medium 503 and an internal memory 504.

The non-volatile storage medium 503 may store an operating system 5031 and a computer program 5032. When the computer program 5032 is executed, it may cause the processor 502 to execute the basketball video interaction method.

The processor 502 is used to provide calculation and control capabilities to support the operation of the entire intelligent basketball stand 500.

The internal memory 504 provides an environment for running the computer program 5032 in the non-volatile storage medium 503. When the computer program 5032 is executed by the processor 502, it may cause the processor 502 to execute the basketball video interaction method.

The wireless communication module 505 is used for network communication, such as providing transmission of data information and the like. Those skilled in the art may understand that the structure shown in FIG. 4 is only a block diagram of a part of the structure related to the solution of the present disclosure, and does not constitute a limitation on the intelligent basketball stand to which the solution of the present disclosure is applied. Specifically, the intelligent basketball stand may include more or fewer components than those shown in the figure, or combine certain components, or have different component arrangements.

The processor 502 is used to run the computer program 5032 stored in the memory to implement the basketball video interaction method disclosed in the embodiment of the present disclosure.

Those skilled in the art may understand that the embodiment of the intelligent basketball stand shown in FIG. 4 does not constitute a limitation on the specific composition of the intelligent basketball stand. In other embodiments, the intelligent basketball stand may include more or fewer components than those shown in the figure, or combine certain components, or have different component arrangements. For example, in some embodiments, the intelligent basketball stand may include only a memory and a processor, and in such an embodiment, the structures and functions of the memory and the processor are consistent with those in the embodiment shown in FIG. 4, which are not detailed here.

It should be understood that, in the embodiments of the present disclosure, the processor 502 may be a central processing unit (CPU), and the processor 502 may also be another general-purpose processor, a digital signal processor (DSP), an application specific integrated circuit (ASIC), a field-programmable gate array (FPGA) or another programmable logical device, a discrete gate or transistor logic device, a discrete hardware component, or the like. The general-purpose processor may be a microprocessor, or the processor may be any conventional processor, or the like.

In another embodiment of the present disclosure, a computer readable storage medium is provided. The computer readable storage medium may be a non-volatile computer readable storage medium. The computer readable storage medium stores a computer program therein, and the computer program, when executed by the processor, implements the basketball video interaction method disclosed by the embodiments of the present disclosure.

Those skilled in the art may clearly understand that, for the convenience and brevity of the description, the specific working processes of equipment, devices and units described above may refer to the corresponding processes in the above described method embodiments, which will not be described here. Those of ordinary skill in the art may realize that the units and algorithm steps of each example described in combination with the embodiments disclosed herein can be implemented by electronic hardware, computer software, or a combination of the two. In order to clearly illustrate the interchangeability of hardware and software, the composition and steps of each example have been described generally in terms of functions in the above description. Whether these functions are performed in hardware or software depends on the specific application and design constraints of the technical solution. Professional technicians may use different methods for each specific application to realize the described functions, but such an implementation shall not be considered as going beyond the scope of the present disclosure.

In several embodiments provided by the present disclosure, it should be understood that the disclosed equipment, devices and methods may be implemented in other ways. For example, the device embodiments described above are merely schematic. For example, the division of the units is only a logical function division, and in the actual implementation, there may be another way of division. Units with the same function may be combined into one unit. For example, multiple units or components may be combined or may be integrated into another system, or some features may be omitted or not performed. In addition, the displayed or discussed mutual coupling or direct coupling or communication connection may be indirect coupling or communication connection through some interfaces, devices or units, or may be electrical, mechanical, or other forms of connection.

Units described as separate components may or may not be physically separated. A component displayed as a unit may or may not be a physical unit. That is, the component displayed as a unit may be located in one place, or may be distributed on multiple network units. Some or all of the units may be selected according to actual needs to achieve the objectives of the solutions in the embodiments of the present disclosure.

In addition, functional units in various embodiments of the present disclosure may be integrated into one processing unit. Respective units may be separate physically, or two or more units may be integrated into one unit. The above integrated unit may be implemented in the form of hardware or in the form of software functional unit.

If the integrated unit is implemented in the form of a software functional unit and is sold or used as an independent product, it may be stored in a storage medium. Based on such an understanding, the essence, or the part contributing to the prior art, of the technical solution of the present disclosure, or all or part of the technical solution may be embodied in the form of a software product. The computer software product is stored in a storage medium and includes some instructions to enable computer equipment (which may be a personal computer, a server, or network equipment, etc.) to perform all or part of the steps of the method described in respective embodiments of the present disclosure. Furthermore, the aforesaid storage medium includes: a U-disk, a removable hard disk, a read-only memory (ROM), a magnetic disk or optical disk, and other various media that may store program codes.

The above descriptions are only specific embodiments of the present disclosure, but the protection scope of the present disclosure is not limited to them. Any person familiar with the technical field can easily think of various equivalent modifications or substitutions within the scope of technology disclosed by the present disclosure, and these modifications or substitutions shall be covered within the protection scope of the present disclosure. Thus, the protection scope of the present disclosure shall be determined according to the protection scope of the appended claims.

The invention claimed is:

1. A basketball video interaction method, which is applied to a host of an intelligent basketball stand that is capable of performing a data interaction with another same intelligent basketball stand, the interaction method comprising:
   judging whether a consent connection instruction sent by a target intelligent basketball stand is received;
   establishing a connection with the target intelligent basketball stand if the consent connection instruction sent by the target intelligent basketball stand is received;
   collecting a local basketball video, sending the local basketball video to the target intelligent basketball stand, and receiving a target end basketball video sent by the target intelligent basketball stand; and
   playing and displaying the target end basketball video locally.

2. The basketball video interaction method according to claim 1, wherein before judging whether a consent connection instruction sent by a target intelligent basketball stand is received, the method further comprises:
   judging whether a cloud server connection instruction is detected;
   receiving a list of current online accounts sent by a cloud server if the cloud server connection instruction is detected;
   obtaining information of a current account corresponding to the intelligent basketball stand, and obtaining a target matching account corresponding to the information of the current account in the list of current online accounts according to a preset account matching strategy, wherein the account matching strategy is used for calculating a similarity between information of respective accounts and the information of the current account, and selecting a corresponding target matching account having a maximum similarity with the information of the current account; and
   generating a connection request according to the target matching account, and sending the connection request to the target intelligent basketball stand corresponding to the target matching account.

3. The basketball video interaction method according to claim 1, wherein before judging whether a consent connection instruction sent by a target intelligent basketball stand is received, the method further comprises:
   judging whether a cloud server connection instruction is detected;
   receiving a list of current online accounts sent by a cloud server if the cloud server connection instruction is detected;
   judging whether an account selected instruction corresponding to the list of current online accounts is detected;
   obtaining a target matching account corresponding to the account selected instruction if the account selected instruction corresponding to the list of current online accounts is detected; and
   generating a connection request according to the target matching account, and sending the connection request to the target intelligent basketball stand corresponding to the target matching account.

4. The basketball video interaction method according to claim 1, wherein after playing and displaying the target end basketball video locally, the method further comprises:
   performing a video splitting on the local basketball video to obtain a corresponding target initial image set;
   obtaining multiple frames of video images from the target initial image set according to a preset interval value to serve as a target image set;
   performing a face recognition on each frame of video image in the target image set, and obtaining user identity information corresponding to each frame of video image to obtain a user identity information set;
   merging a same user identity information in the user identity information set to obtain a de-duplicated user identity information set;
   judging whether a number of pieces of the user identity information in the de-duplicated user identity information set is greater than 1; and
   sending a pause notification message used for prompting a pause to the target intelligent basketball stand, if the number of pieces of the user identity information in the de-duplicated user identity information set is greater than 1.

5. The basketball video interaction method according to claim 4, wherein after obtaining multiple frames of video images from the target initial image set according to a preset interval value to serve as a target image set, the method further comprises:
   performing a facial emotion recognition on each frame of video image in the target image set to obtain facial emotion recognition result values corresponding to each frame of video image in the target image set;
   performing an averaging operation on the facial emotion recognition result values corresponding to each frame of video image in the target image set to obtain a corresponding average facial emotion recognition result value;
   obtaining an emotion recognition result corresponding to the target image set according to the average facial emotion recognition result value and a pre-stored mapping list of the facial emotion recognition result value and the emotion recognition result; and
   obtaining a target audio data set, whose emotional label is the same as the emotion recognition result, from pre-stored multiple audio data sets, and playing the target audio data set.

6. The basketball video interaction method according to claim 1, wherein after collecting a local basketball video, sending the local basketball video to the target intelligent basketball stand, and receiving a target end basketball video sent by the target intelligent basketball stand, the method further comprises:
   obtaining a current site temperature value and a current site humidity value collected;
   performing a normalization processing on the current site temperature value to obtain a current site temperature normalization value corresponding to the current site temperature value;
   summing the current site temperature normalization value and the current site humidity value to obtain a current site environment parameter value;
   obtaining a site environment recognition result corresponding to the current site temperature value and the current site humidity value, according to the current site environment parameter value and a pre-stored mapping list of the environment parameter value and the site environment recognition result; and obtaining a target audio data set, whose site environment label is the same as the site environment recognition result, from pre-stored multiple audio data sets, and playing the target audio data set.

7. The basketball video interaction method according to claim 1, wherein after collecting a local basketball video, sending the local basketball video to the target intelligent basketball stand, and receiving a target end basketball video sent by the target intelligent basketball stand, the method further comprises:

receiving current motion data uploaded by a smart wearable bracelet of a user, wherein the current motion data is a number of motion steps, an average motion heart rate or a motion energy consumption value;

sending a motion data acquisition instruction of a list of current online accounts to a cloud server;

obtaining online user motion data corresponding to respective online accounts in the list of current online accounts correspondingly sent by the cloud server according to the motion data acquisition instruction;

arranging the current motion data and the online user motion data corresponding to respective online accounts in a descending order to obtain a sorted user motion data list; and playing and displaying the sorted user motion data list locally.

8. A basketball video interaction device, configured in a host of an intelligent basketball stand that is capable of performing a data interaction with another same intelligent basketball stand, wherein the interaction device comprises units for implementing the method according to claim 1.

9. An intelligent basketball stand, comprising a host comprising a memory, a processor, and a computer program stored on the memory and executable on the processor, wherein the processor implements the basketball video interaction method according to claim 1 when executing the computer program.

10. A computer readable storage medium, wherein a computer program is stored in the computer readable storage medium, and when executed by a processor, the computer program causes the processor to implement the basketball video interaction method according to claim 1.

\* \* \* \* \*